Dec. 29, 1964   R. N. CORDY ETAL   3,163,759
NEUTRON FLUX DETECTOR
Filed May 24, 1962   2 Sheets-Sheet 1

INVENTORS
ROBERT N. CORDY
JOHN W. FLORA
BY
AGENT

Dec. 29, 1964  R. N. CORDY ETAL  3,163,759
NEUTRON FLUX DETECTOR

Filed May 24, 1962  2 Sheets-Sheet 2

INVENTORS
ROBERT N. CORDY
BY JOHN W. FLORA

Donald J. Ellingsberg
AGENT 3,163,759
NEUTRON FLUX DETECTOR
Robert N. Cordy, Sherman Oaks, Calif., and John W.
Flora, Denver, Colo., assignors, by mesne assignments,
to the United States of America as represented by the
United States Atomic Energy Commission
Filed May 24, 1962, Ser. No. 197,470
9 Claims. (Cl. 250—83.1)

The present invention relates to a neutron flux detector and more particularly to a resistance thermometer neutron flux detector having a resistance element formed from a fissionable alloy.

The study of nuclear reactors, particularly their kinetic behavior, requires special instrumentation. The instrumentation should include instruments capable of responding to signals from the reactor core that represent flux intensities, core pressures, temperatures and the like which can traverse several decades in a few milliseconds. As an example, a homogeneous reactor is equipped for routine production of power bursts with periods of one millisecond and resulting peak powers of 2000 megawatts. During such power bursts, special instruments, such as neutron flux detectors, are required that respond to and measure accurately the relatively short, high intensity transient neutron flux densities. These densities can often rise and fall through a factor of 10 in magnitude at a time interval as short as 7 milliseconds. The neutron flux detectors must provide an accurate measurement of these rapid variations if reactivity calculations made from the power bursts are to yield meaningful results. A neutron flux detector, therefore, must be able to respond to reactor burst periods as low as one millisecond with accompanying thermal neutron and gamma fluxes of $10^{16}$ neutron flux (nv) and $10^7$ R/sec., respectively. Space limitations further require that such a detector occupy a volume less than a few cubic centimeters since it is desirable to monitor the neutron density history at a localized area adjacent to a reactor core.

Accordingly, it is an object of the invention to provide a new and improved neutron flux detector of the resistance thermometer type.

Another object of the invention is to provide a new and improved resistance thermometer neutron flux detector having an internally generated heat source.

Yet another object of the invention is to provide a new and improved neutron flux detector having a fissionable sensing element.

Still another object of the invention is to provide a new and improved neutron flux detector having rapid response characteristics to accurately measure transient neutron flux.

Briefly, in accordance with the invention, a neutron flux detector is provided having a resistance element formed from a fissionable alloy electrically connected to a suitable calibrating means. The resistance element, upon exposure to a neutron flux source, internally generates fission heat in a manner directly proportional to the neutron flux integral to provide a virtual zero thermal time constant, facilitating an accurate determination of the intensity of the neutron source by differentiating the resulting resistance-time function.

Further objects and advantages of the invention will become apparent and may best be understood by reference to the following detailed description, taken together with the accompanying drawings in which.

Figure 1:
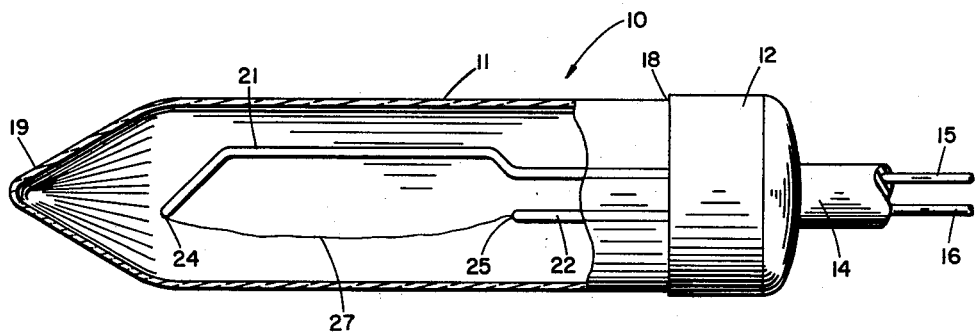
FIG. 1 is an enlarged elevation of the neutron flux detector of the invention having a portion broken away.
Figure 2:
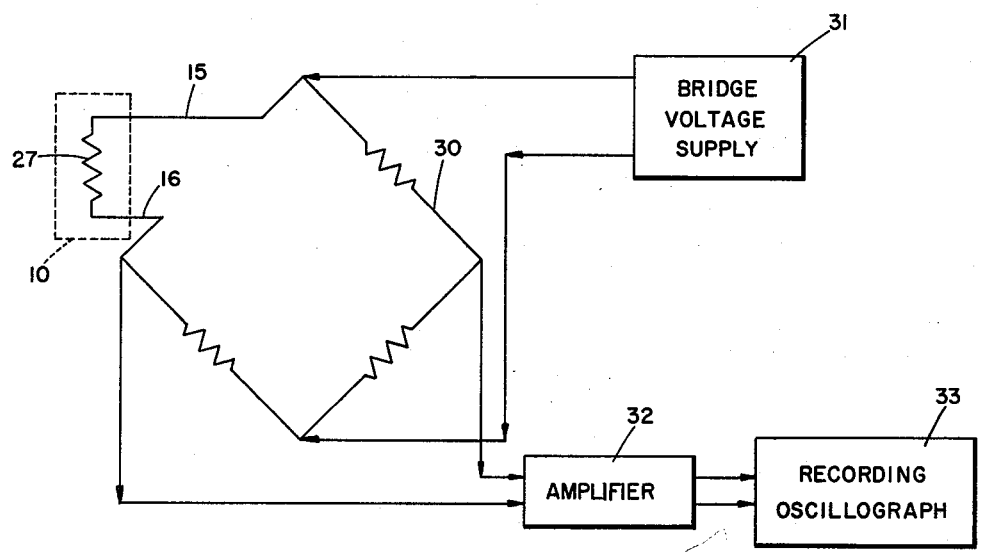
FIG. 2 is a schematic drawing of one calibrating circuit where the neutron flux detector of FIG. 1 has use.

Referring to FIG. 1 of the drawings, the neutron flux detector 10 of the invention has a glass tube 11 that is retained at one end by a suitable base or housing member 12. A protective sheath 14 extends axially from the base 12 and contains therein suitable electrically conductive lead wires 15 and 16. The lead wires 15 and 16 facilitate connection of the neutron flux detector 10 to a suitable electrical circuit such as shown by FIG. 2 which will be discussed subsequently. The base or housing 12 also provides an atmospheric seal 18 about the periphery of the glass tube 11. The glass tube 11 is preferably evacuated and sealed in a usual manner to form the elongated tip portion 19. Electrically conductive extensions 21 and 22 of the lead wires 15 and 16, respectively, extend longitudinally into the glass tube 11 and are suitably maintained in a spaced relationship therein. Support wires 21 and 22 are preferably formed from platinum while lead wires 15 and 16 may be formed from platinum or the like. Support wire 21 and support wire 22 are spaced apart to provide a suitable linear gap between the end 24 of support wire 21 and the end 25 of support wire 22. A resistance sensing element 27 is electrically connected to ends 24 and 25 to bridge the gap. The sensing element 27 is formed from a fissionable material into a generally straight wire configuration. The fissionable material is a workable uranium composition such as platinum-uranium alloys; one such alloy has a weight ratio of platinum, 95 percent by weight, and uranium, 5 percent by weight. The fissionable material is drawn to a suitable diameter so that a length-to-diameter ratio of the resistance element minimizes heat losses from the element. The glass tube 11 is preferably formed from a soft glass, i.e. non-borated, to avoid shielding the resistance sensing element 27 from a neutron source.

Upon exposure of the neutron flux detector 10 to neutrons, the resistance sensing element 27 formed from the fissionable material will internally generate fission heat. The heat loss from the element 27 is negligible since the transient neutron bursts generally have periods of about one millisecond. The internally generated fission heat in the resistance sensing element 27 thus provides a substantially instantaneous value of the neutron flux source by the measured change in the internal resistance characteristics of the sensing element since the resistance element heats in a manner directly proportional to the neutron flux integral.

One form of an electrical schematic for measuring the intensity of the neutron source is shown by FIG. 2. The neutron flux detector 10 of FIG. 1 is positioned in a balanced Wheatstone bridge circuit 30 where the resistance sensing element 27 provides the unknown resistance arm in the bridge circuit. A bridge voltage supply 31 supplies power to the unbalanced bridge circuit 30. The change in resistance of the sensing element 27 causes an unbalance in the bridge circuit 30 that is calibrated by conducting the voltage signal from the bridge circuit 30 to a suitable amplifier 32 which is then converted to a neutron flux intensity measurement on a calibrated recording oscillograph 33.

Figure 3:
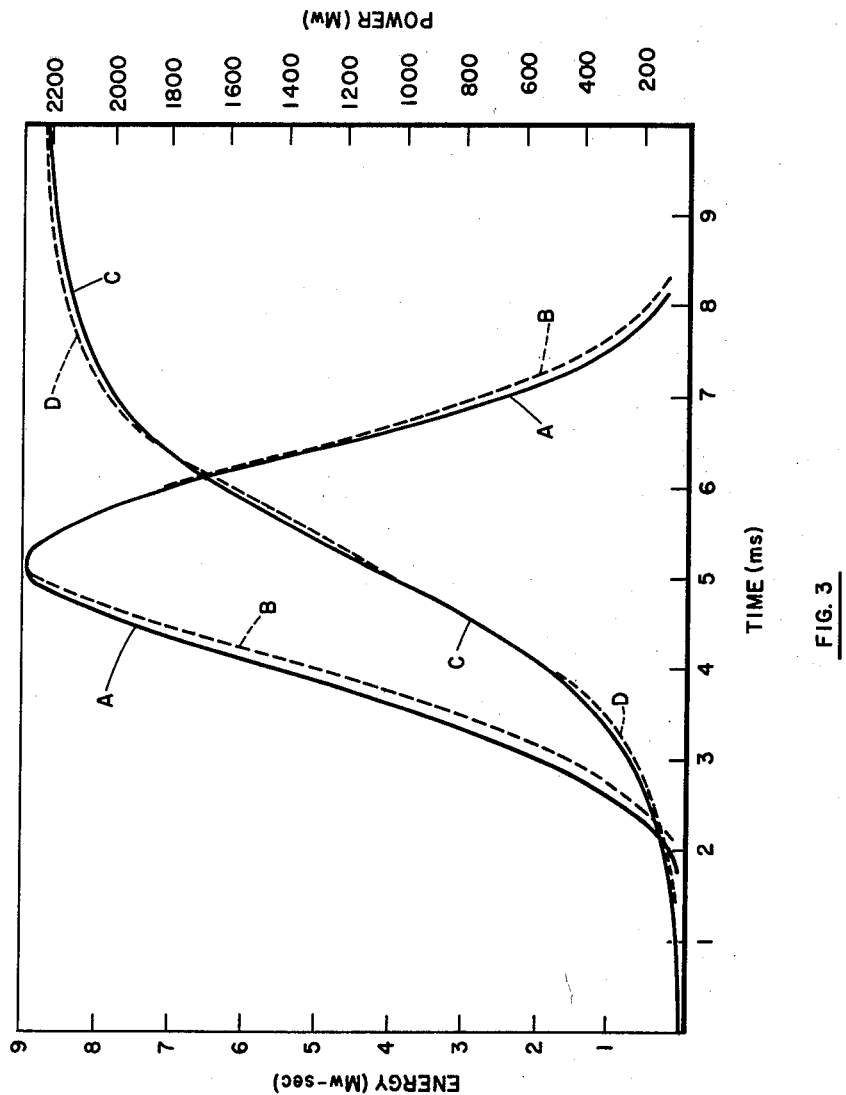
FIG. 3 is a graphical representation of recording curves developed by the neutron flux detector of FIG. 1 when connected in a circuit such as shown by FIG. 2.

FIG. 3 shows a comparison between curves developed from measurements realized by use of the neutron flux detector of the invention and those developed by a conventional boron coated ionization chamber. The graph has as its axis of abscissas, time in milliseconds, and as its axis of ordinates, energy and power. The solid curve A represents a power trace as recorded by the boron coated ionization chamber. Curve A shows a period of about one millisecond with a peak power burst of the reactor of 2200 megawatts. The total power trace spans a period less than nine milliseconds. The dashed curve B indicates the measured power trace as developed by the neutron flux detector of the invention as shown by FIG. 1. Similarly, solid curve C indicates an energy trace recorded by the ionization chamber while dashed curve D indicates the same energy trace as developed by the neutron flux detector of the invention.

FIG. 3 serves to graphically illustrate that by the utilization of the invention as shown by FIG. 1, a reduction in time delays previously experienced in the response of a detector instrument to an external neutron flux source is realized. The fissionable resistance sensing element 27 resolves a virtually instantaneous value of the neutron flux source by differentiating the resulting resistance-time function through electrical circuitry such as shown by FIG. 2.

Figure 4:
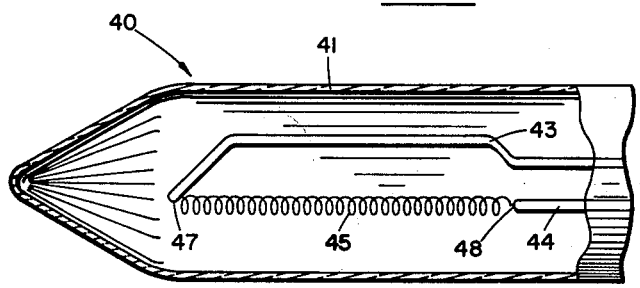
FIG. 4 is an enlarged view of a modification of the resistance element of the neutron flux detector shown by FIG. 1.

FIG. 4 shows a modification of the resistance element 27 shown by FIG. 1. In FIG. 4, the partially shown neutron flux detector 40 is similar in structural aspects to the neutron flux detector 10 shown by FIG. 1. The detector 40 has an evacuated glass tube 41 that contains suitably positioned support wires 43 and 44. A helical resistance sensing element 45 is electrically connected to end 47 of support wire 43 and to end 48 of support wire 44 to complete a resistance thermometer neutron flux detector 40 similar in operation to the previously described neutron flux detector 10 as shown by FIG. 1. The helical element 45 substantially increases the length-to-diameter ratio of the sensing element and results in improved heat retention characteristics. For example, the generally straight wire sensing element 27 as shown by FIG. 1 has, in one instance, a length of about 1.25 inches and a diameter of 1 mil. The helical sensing element 45 of the modification shown by FIG. 4 provides a total length of about 14 inches across the linear gap of about 1.25 inches with the same diameter of 1 mil. This increase in the length-to-diameter ratio of the sensing element 45 is desirable in the detection of neutron transient measurements where heat losses from the resistance element must be minimized. The helical sensing element 45 of the neutron flux detector 40 has negligible heat losses for neutron bursts having initial periods as long as 50 milliseconds, whereas the straight wire sensing element 27 of the neutron flux detector 10 reaches near optimum detection characteristics at periods of about 10 milliseconds.

As will be evidenced from the foregoing description, certain aspects of the neutron flux detector of the invention are not limited to the particular details of the constructions illustrated and it is contemplated that other modifications and applications will occur to those skilled in the art. It is therefore intended that the appended claims shall cover such modifications and applications that do not depart from the true spirit and scope of the invention.

Having described the invention, what is claimed is:

1. A neutron flux detector comprising,
   (a) an enclosure means,
   (b) a fissionable resistance material positioned within said enclosure means, and
   (c) means electrically joining said resistance material to a measuring means,
   (d) said material fissioning upon exposure to a neutron source to internally generate heat, thereby indicating the intensity of the neutron source.

2. A neutron flux detector comprising,
   (a) an enclosure means,
   (b) first and second electrical conductor means having ends positioned within said enclosure in a spaced apart relationship,
   (c) a fissionable resistance element electrically joining said spaced apart first and second conductor means, and
   (d) a flux measuring means electrically joined to said first and second conductor means,
   (e) said resistance element fissioning upon exposure to a neutron source to internally generate heat, thereby indicating the intensity of the neutron source.

3. The neutron flux detector of claim 2 in which said enclosure means is evacuated.

4. The neutron flux detector of claim 2 in which said enclosure means is formed from non-borated glass.

5. The neutron flux detector of claim 2 in which said resistance element is formed from a platinum-uranium alloy.

6. The neutron flux detector of claim 5 in which said alloy comprises 95% by weight platinum and 5% by weight uranium.

7. The neutron flux detector of claim 2 in which said resistance element has a generally helical configuration.

8. A neutron flux detector comprising,
   (a) a soft glass enclosure means,
   (b) first and second electrical conductor means having ends positioned within said enclosure means in a spaced apart relationship,
   (c) a platinum-uranium resistance element electrically joining said spaced apart first and second conductor means within said enclosure means, and
   (d) a flux measuring means electrically joined to said first and second conductor means,
   (e) said resistance element fissioning upon exposure to a neutron source to internally generate heat, thereby indicating the intensity of the neutron source.

9. The neutron flux detector of claim 8 in which said resistance element has a generally helical configuration.

References Cited by the Examiner
UNITED STATES PATENTS

| | | | |
|---|---|---|---|
| 2,564,626 | 9/51 | MacMahon et al. | 250—83.1 |
| 2,993,138 | 7/61 | Scott | 313—61 |
| 3,101,410 | 8/63 | Ruby et al. | 250—83.1 |

RALPH G. NILSON, *Primary Examiner.*

ARCHIE R. BORCHELT, *Examiner.*